(12) United States Patent
Kleckler

(10) Patent No.: US 7,966,994 B2
(45) Date of Patent: Jun. 28, 2011

(54) SYSTEM FOR METERING A FUEL SUPPLY

(75) Inventor: Joel W. Kleckler, Rockton, IL (US)

(73) Assignee: Woodcard, Inc., Fort Collins, CO (US)

( * ) Notice: Subject to any disclaimer, the term of this patent is extended or adjusted under 35 U.S.C. 154(b) by 359 days.

(21) Appl. No.: 12/189,859

(22) Filed: Aug. 12, 2008

(65) Prior Publication Data

US 2010/0037867 A1    Feb. 18, 2010

(51) Int. Cl.
*F02M 37/04*    (2006.01)
(52) U.S. Cl. .................................................. 123/510
(58) Field of Classification Search ............ 123/452, 123/453, 454, 510, 527, 568.29, 577, 446, 123/511; 60/39.281, 226.1, 242, 734, 761; 48/189
See application file for complete search history.

(56) References Cited

U.S. PATENT DOCUMENTS

| | | | |
|---|---|---|---|
| 3,999,527 A | 12/1976 | Wessel et al. | |
| 4,042,151 A | 8/1977 | Uttech | |
| 4,052,135 A | 10/1977 | Shoop et al. | |
| 4,068,980 A | 1/1978 | Fine et al. | |
| 4,147,475 A | 4/1979 | Shoop et al. | |
| 4,190,030 A | 2/1980 | Chester | |
| 4,553,519 A | 11/1985 | Masson | |
| 4,643,635 A | 2/1987 | Leachman, Jr. | |
| 4,719,750 A * | 1/1988 | Lemmin | 60/226.1 |
| 5,111,653 A | 5/1992 | Leeson | |
| 5,518,025 A | 5/1996 | Futa, Jr. et al. | |
| 6,468,051 B2 | 10/2002 | Lampe et al. | |
| 6,962,485 B2 | 11/2005 | Bennett et al. | |
| 6,981,359 B2 | 1/2006 | Wernberg et al. | |
| 7,007,452 B1 | 3/2006 | Baryshnikov et al. | |
| 7,096,658 B2 | 8/2006 | Wernberg et al. | |
| 7,234,293 B2 | 6/2007 | Yates et al. | |
| 7,337,761 B2 | 3/2008 | Bickley | |
| 2003/0192300 A1 | 10/2003 | Mahoney et al. | |
| 2005/0166573 A1 | 8/2005 | Hommema | |
| 2005/0217236 A1 | 10/2005 | Wernberg et al. | |
| 2005/0223690 A1 * | 10/2005 | Wernberg et al. | 60/39.281 |
| 2006/0266047 A1 | 11/2006 | Eick et al. | |
| 2007/0199301 A1 * | 8/2007 | Shelby et al. | 60/39.281 |

* cited by examiner

*Primary Examiner* — Hai H Huynh
(74) *Attorney, Agent, or Firm* — Reinhart Boerner Van Deuren P.C.

(57) ABSTRACT

A system for metering fuel to an engine. The system includes a fuel metering valve having a throttled inlet and a throttled outlet. The system also provides regulation of redundant pump supplies of fuel to the engine. The throttling of the inlet to the fuel metering valve is provided by a valve that also functions to selectively couple a second fuel pump to the fuel metering valve.

30 Claims, 3 Drawing Sheets

SYSTEM FOR METERING A FUEL SUPPLY

FIELD OF THE INVENTION

This invention related to metering of a fuel supply to an engine and more particularly to a system for metering fuel including a fuel metering valve having a throttled input and a throttled output.

BACKGROUND OF THE INVENTION

In a centrifugal pump supplied fuel metering system to an engine, for example a gas turbine engine, a throttling valve must be placed down stream of the metering valve. Flow regulation for a high speed centrifugal pump for an engine is controlled with a fuel metering valve that is positioned in response to selected engine parameters. The throttle valve is arranged in series with the metering valve. The throttle valve provides a variable restriction orifice in the fuel flow path that influences the pressure drop across the fuel metering valve. The throttle valve opens and closes the variable restriction orifice to regulate a constant pressure drop across the metering valve. To keep the metering valve pressure drop constant a pressure sensor is coupled to the fuel metering valve to sense the pressure drop across the fuel metering valve. The pressure sensor controls the throttle valve position. Stability of the fuel supply pressure across the fuel metering valve is important to maintain proper engine performance throughout the range of the fuel metering operation. It is found that in systems requiring redundant fuel supply pumps maintaining stability of the fuel supply across the fuel metering valve is difficult.

Accordingly, there is a need to provide a system for metering a fuel supply that can be used in conjunction with a down stream throttling valve to provide regulation of redundant fuel supply pumps and to maintain stability of the fuel supply pressure across the fuel metering valve.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market.

The invention provides such a fuel metering valve. These and other advantages of the invention, as well as additional inventive features, will be apparent from the description of the invention provided herein.

BRIEF SUMMARY OF THE INVENTION

There is provided a system for metering a fuel supply to an engine. The fuel supply includes a first fuel supply pump and a second fuel supply pump. The system for metering a fuel supply includes, a fuel metering valve including an inlet port and an outlet port. The inlet port is in selective fluid communication with the first and second fuel supply pumps and the outlet port is in fluid communication with the engine. A throttling valve is in fluid series with the outlet port of the fueled metering valve and the engine. A pump select valve is in fluid series with the inlet port of the fuel metering valve and the discharge of the second fuel supply pump, wherein the throttling valve is configured to throttle the outlet port of the metering valve, and the pump select valve is configured to throttle the outlet of the second supply pump.

There is also provided a system for metering a fuel supply to an engine, with the fuel supply including a first fuel supply pump and a second fuel supply pump. The system for metering includes a fluid metering valve, including an inlet port and an outlet port. The inlet port is in selective fluid communication with the first and second fuel supply pumps and the outlet port is in fluid communication with the engine. A throttling valve is in fluid series with the outlet port of the fuel metering valve and the engine. The throttling valve is configured to throttle the outlet port of the metering valve. A pump select valve is in fluid series with the inlet port of the fluid metering valve. The pump select valve is configured to throttle the output of the second supply pump, wherein the throttling valve and the pump select valve are in direct fluid communication with each other and configured to provide a stabilizing pumping volume at the outlet volume of the fuel metering valve through conduits.

There is further provided a system for metering a fuel supply to an engine, the fuel supply including a first fuel supply pump and a second fuel supply pump. The system for metering includes a fuel metering valve, including an inlet port and an outlet port. The inlet port is in selective fluid communication with the first and second fuel supply pumps and with the outlet port in fluid communication with the engine. A throttling valve is in fluid series with the outlet port of the fuel metering valve and the engine. The throttling valve is configured to throttle the outlet port of the metering valve. A pump select valve is in fluid series with the inlet port to the fuel metering valve and the outlet of the second fuel supply pump. The pump select valve is configured to throttle the output of the second fuel supply pump. A delta-P regulator is in fluid communication with the outlet port of the fuel metering valve in each of the pump select valve and throttling valve, wherein in a pressure difference between the inlet port and the outlet port of the fuel metering valve is controlled at a preselected set point and wherein the throttling valve and pump select valve are in direct fluid communication with each other and configured to provide a stable pumping volume at the outlet volume of the fuel metering valve.

There is additionally provided a redundant fuel supply system for an engine, with a first fuel supply and a second fuel supply. The redundant fuel supply system includes a first fuel pump coupled to the first fuel supply. A second fuel pump coupled to the second fuel supply. A fuel metering valve, including an inlet port and an outlet port, with the inlet port in selective fluid communication with the first and second fuel supply pumps and with the outlet port of the fuel metering valve in fluid communication with the engine. The throttling valve is in fluid series with the outlet port of the fuel metering valve and the engine, the throttling valve is configured to throttle the outlet port of the metering valve. A pump select valve is in fluid series with the outlet of the second fuel supply pump. The pump select valve is configured to throttle the output of the second fuel supply pump. A delta-P regulator is in fluid communication with the outlet port of the fuel metering valve in each of the pump select valve and throttling valve, wherein a pressure difference between the inlet port and outlet port of the fuel metering valve is controlled at a preselected set point and wherein the throttling valve and pump select valve are in direct fluid communication with each other and configured to provide a stabilizing pump volume at the outlet port to the fuel metering valve. In another embodiment, the fuel select valve is further configured to selectively couple the second fuel supply pump and the metering valve in fluid series. In another embodiment, the first fuel pump is one of a centrifugal pump and a pressure regulated positive displacement pump and the second fuel pump is one of a centrifugal pump and a pressure regulated positive displacement pump.

The apparatus of the present disclosure is of a construction which is both durable and long lasting, and should require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the system for metering a fuel supply and, together with the description, serve to explain the principles of the system for metering a fuel supply. In the drawings.

These and other advantages of the present disclosure are best understood with reference to the drawings, in which.

While the system for metering a fuel supply will be described in connection with certain preferred embodiments, there is no intent to limit it to those embodiments. On the contrary, the intent is to cover all alternatives, modifications and equivalents as included within the spirit and scope of the appended claims.

DETAILED DESCRIPTION OF THE INVENTION

Figure 1:
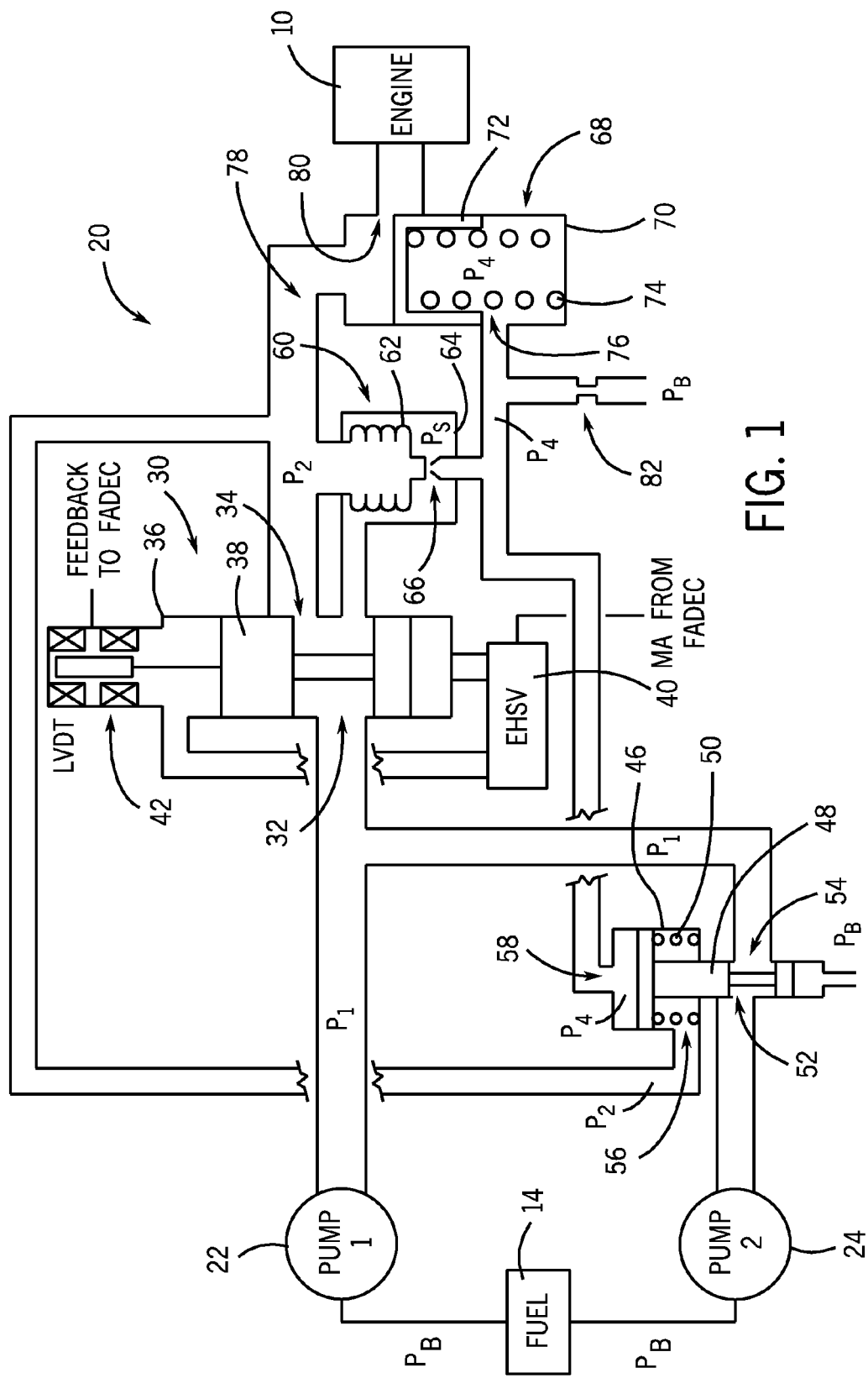
FIG. 1 is a schematic diagram of an exemplary embodiment of a system for metering a fuel supply, including a pump select valve, a metering valve and an output throttling valve.
Figure 2:
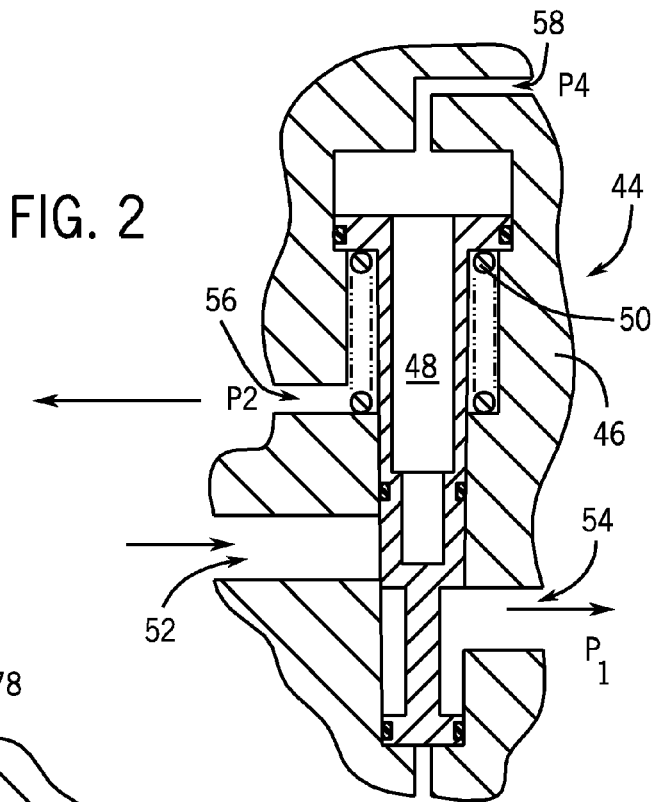
FIG. 2 is a schematic diagram of an exemplary embodiment of the pump select valve illustrated in FIG. 1, which valve is configured to selectively couple a fuel pump to the metering valve.
Figure 3:
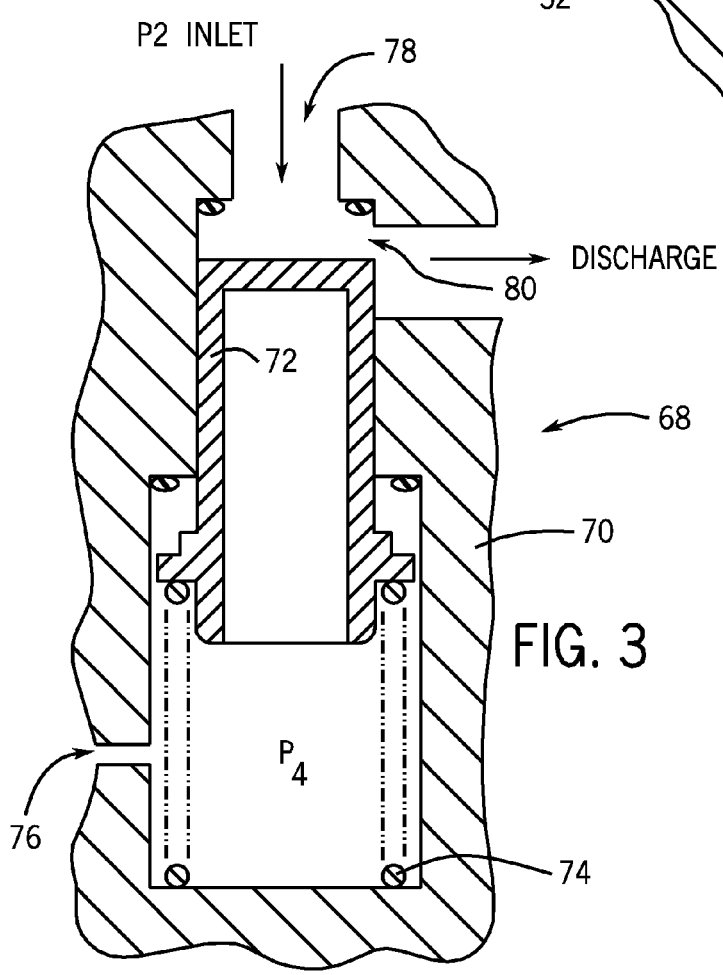
FIG. 3 is a schematic diagram of an exemplary embodiment of the output throttling valve illustrated in FIG. 1.

Referring to FIGS. 1-3, FIG. 1 is a schematic diagram of an exemplary embodiment of a system for metering 20 a fuel supply to an engine 10, with the system 20 including a first fuel supply pump 22 and a second fuel supply pump 24 each coupled to a fuel supply 14. It should be understood that the fuel supply 14 can be too separate and independent fuel reservoirs with each fuel supply pump coupled to one of the independent fuel reservoirs. In a redundant fuel supply system for an engine, two separate fuel pumps are typically provided with each fuel pump coupled to the reservoirs.

As illustrated in FIG. 1, the engine 10 receives fuel through a fuel metering valve 30. The fuel metering valve 30 includes an inlet port 32 and an outlet port 34. The inlet port 32 is in selective fluid communication with the first 22 and second 24 fuel supply pumps and the outlet port 34 of the fuel metering valve 30 is in fluid communication with the engine 10.

The system for metering 20 a fuel supply further includes a throttling valve 68 in fluid series with the outlet port 34 of the fuel metering valve 30 and the engine 10. A pump select valve 44 is in fluid series with the inlet port 32 of the fuel metering valve 30 and the outlet of the second fuel supply pump 24. The throttling valve 68 is configured to throttle the outlet port 34 of the metering valve 30, and the pump select valve is configured to throttle the output of the second fuel supply pump 24.

The fuel metering valve 30 includes a valve piston 38 which reciprocally moves within a valve housing 36 with the valve piston 38 configured to open and close the inlet 32 and outlet 34 ports of the fuel metering valve 30 in response to an electrohydraulic servo valve 40 (EHSV). The position of the fuel metering valve 30 is fed back to a full authority digital electronic control (FADEC) (not shown) through a linear variable displacement transducer 42 (LVDT) feedback signal.

The differential pressure (P1-P2) across the metering port is maintained by a delta-P regulator 60. The delta-P regulator 60 includes a bellows 62 and a nozzle 66 disposed in a housing 64.

If the differential pressure across the metering port (P1-P2) is too high (above the desired delta-P set-point resulting in too much fuel flow), the bellows 62 of the delta-P regulator 60 compresses, the nozzle 66 opens and the pressure P4 increases. The increasing P4 pressure closes both the pump select valve 44 through conduit 58 and the throttling valve 68 through conduit 76, resulting in decreasing metered port flow until the differential pressure across the metering port meets the regulation point or the desired delta-P set-point.

If the differential pressure (P1-P2) is too low (below the desired delta-P set-point, resulting in too low of metered flow), the bellows 62 of the delta-P regulator 60 extends, and the nozzle 66 closes and P4 decreases. The decreased P4 pressure opens both the pump select valve 44 and the throttling valve 68 by draining off the P4 fluid pressure to sump through orifice 82, thus opening both the pump select valve 44 and the metering valve 30, resulting in increased metering port flow until the differential pressure across the metering port of the fuel metering valve 30 meets the regulation point or selected delta-P set-point.

Figure 4:
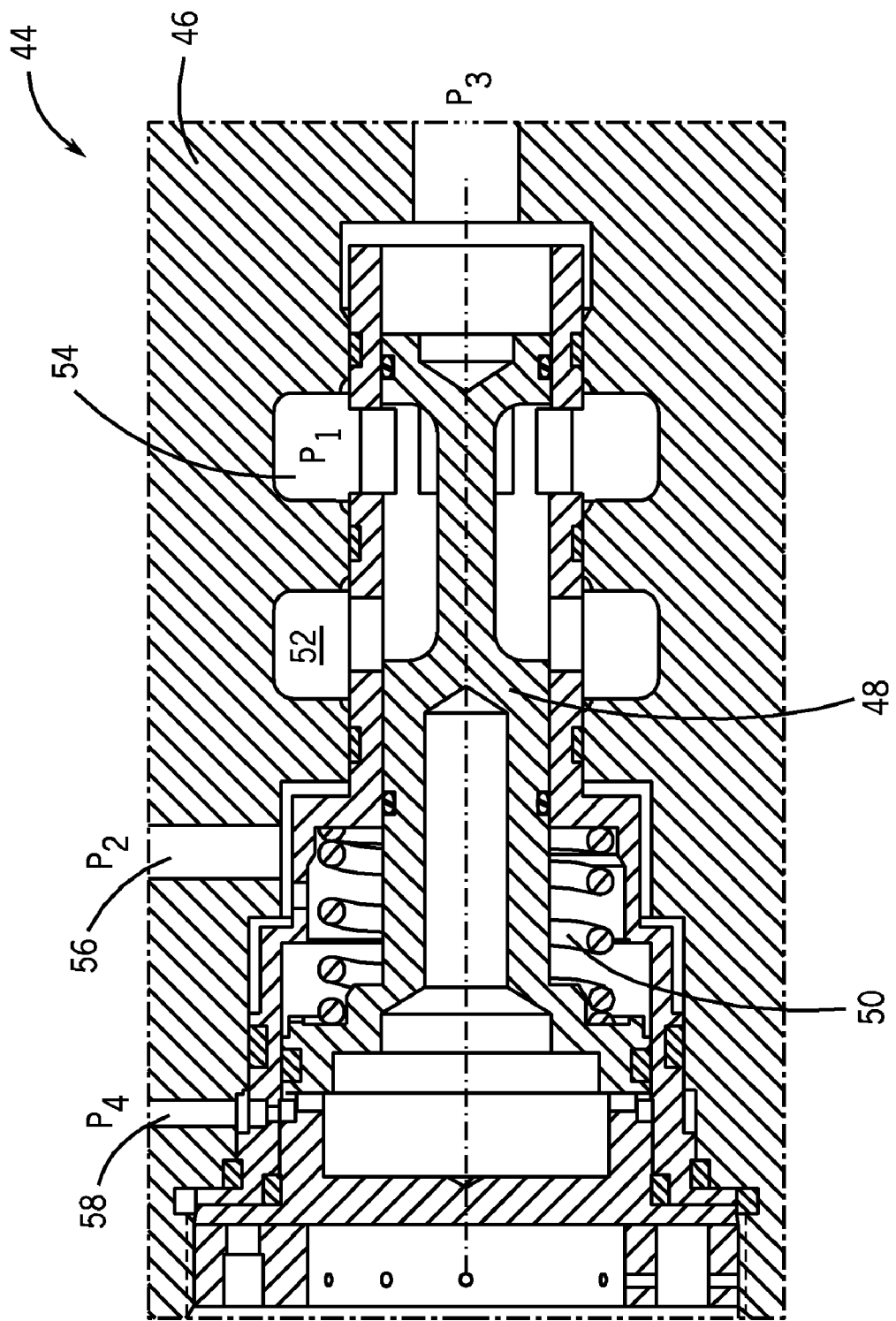
FIG. 4 is a cross sectional view of an exemplary embodiment of the pump select valve of the system for metering illustrated in FIG. 1.

As illustrated in FIG. 1 and specifically FIGS. 2 and 4, the pump select valve 44 includes a valve piston 48 configured to reciprocally move within the valve housing 46 with the valve piston 48 normally biased in an open position by valve spring 50. The valve piston 48 is configured to open and close the orifice 54 and orifice 52. Orifice 52 couples the pump select valve 44 to the second fuel supply pump 24 and orifice 54 couples the pump select valve 44 to the inlet port 32 of the fuel metering valve 30.

The pump select valve 44 also includes a conduit 56 which is coupled to the outlet volume of the fuel metering valve 30. Conduit 58 of the pump select valve 44 is in direct fluid communication with the throttling valve 68.

The throttling valve 68 as illustrated in FIGS. 1 and 3 includes a valve housing 70. A valve piston 72 is configured to reciprocally move within the valve housing 70 and is normally biased in a closed position by a valve spring 74. The valve piston 72 opens and closes the outlet port 80 which is in fluid communication with the engine 10 and a conduit volume 78 which is in fluid communication with the outlet port 34 of the fuel metering valve 30. The valve housing 70 of the throttling valve 68 also defines a fluid conduit 76 which is in direct fluid communication with the pump select valve 44.

The throttling valve 68 is arranged in fluid series with the fuel metering valve 30 to regulate the pressure drop across the fuel metering valve 30 and is arranged down stream of the fuel metering valve 30.

The pump select valve 44 functions as a throttling valve to the output of the second fuel supply pump 24 in conjunction with the throttling valve 68 which throttles the outlet port 34 of the fuel metering valve 30. Such configuration provides regulated stability to displace fluid into and out of conduit volume 78.

As described above the differential pressure P1 minus P2 is monitored and controlled by the delta-P regulator 60. As the delta-P regulator 60 opens and closes its nozzle 66 the fluid in the conduit volume which directly couples the pump select valve 44 and the throttling valve 68 adjusts the P4 pressure. In a throttle back condition, P4 pressure increases which moves the valve piston 72 of the throttling valve 68 to close the outlet port 80. Increased P4 pressure also moves the valve piston 48 of the pump select valve 44 to throttle port 52. As the pistons 72 and 48 of the throttling valve 68 and pump select valve 44 respectively, move, the P2 pressure is increased by the push back of the fluid in the conduit volume 78. Such push back assist in stabilizing the dynamics of the system for metering 20.

The system for metering 20 a fuel supply as disclosed in this application provides throttling for two separate fuel pumps. The pump select valve 44 is configured to selectively couple the second fuel supply pump 24 to the fuel metering valve 30 in fluid series.

As illustrated in FIG. 1, the first fuel supply pump 22 is directly coupled, in fluid series, with the inlet port 32 of the fuel metering valve 30. In one embodiment the first fuel pump 22 is a centrifugal pump and the second fuel pump 24 is a positive displacement variable delivery vane pump. It is contemplated that other types of pumps can be used with the disclosed system for metering 20. As configured, the system for metering 20 a fuel supply to an engine 10 provides redundant fuel pump capability. In other words if either pump 22 or 24 fails during operation, the other pump will provide back up flow of fuel to the engine 10.

In one scenario, the system 20 provides for a normal start sequence in which the positive displacement pump 24 provides initial fuel flow through the pump select valve 44 to the metering valve 30 as the engine starts and gets up to speed. When sufficient speed is provided to engine 10 the centrifugal fuel pump 22 provides fuel flow for a normal run operation. The configuration of the system for the pump select valve 44 and the throttling valve 68 in which the fuel select valve 44 throttles the output of second fuel supply pump 24 provides a stable condition for the fuel supply system.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

It may therefore be appreciated from the above detailed description of the preferred embodiment of the present disclosure that a system for metering fuel to an engine includes a fuel metering valve having a throttled inlet and a throttled outlet and providing regulation of redundant pump supplies.

Although the foregoing description of the present disclosure has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the system for metering fuel as described herein may be made, none of which depart from the spirit or scope of the present disclaimer. The particular embodiments and applications were chosen and described to provide the best illustration of the principles of the system for metering fuel and its practical application to thereby enable one of ordinary skill in the art to utilize the system in various embodiments and with various modifications as are suited to the particular use contemplated. All such changes, modifications, variations, and alterations should therefore be seen as being within the scope of the appended claims when interpreted in accordance with the breadth to which they are fairly, legally, and equitably entitled.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for metering a fuel supply to an engine, the fuel supply including a first fuel supply pump and a second fuel supply pump, the system for metering comprising:
   a fuel metering valve, including an inlet port and an outlet port, with the inlet port in selective fluid communication with the first and second fuel supply pumps and with the outlet port in fluid communication with the engine;
   a throttling valve in fluid series with the outlet port of the fuel metering valve and the engine; and
   a pump select valve in fluid series with the inlet port of the fuel metering valve and the outlet of the second fuel supply pump;
   wherein the throttling valve is configured to throttle the outlet port of the metering valve, and the pump select valve is configured to throttle the output of the second fuel supply pump.

2. The system for metering a fuel supply of claim 1, wherein the pump select valve is further configured to selectively couple the second fuel supply pump and the fuel metering valve in fluid series.

3. The system for metering a fuel supply of claim 1, wherein the first fuel supply pump is directly coupled, in fluid series, with the inlet port of the fuel metering valve.

4. The system for metering a fuel supply of claim 1, wherein the throttling valve is biased in a closed position and the pump select valve is biased in an open position.

5. The system for metering a fuel supply of claim 1, wherein the throttling valve and pump select valve are in direct fluid communication and configured to provide a stabilizing pumping volume to the discharge volume of the fuel metering valve.

6. The system for metering a fuel supply of claim 1, including a delta-P regulator in fluid communication with the outlet port of the fuel metering valve and each of the pump select valve and throttling valve, wherein a pressure difference between the inlet port and outlet port of the fuel metering valve is controlled at a preselected set point.

7. The system for metering a fuel supply of claim 6, wherein:
the pump select valve includes a pump select valve piston within a pump select valve housing, the pump select valve piston reciprocally moving within the pump select valve housing to selectively fluidly communicate the second fuel supply pump and the inlet port of the fuel metering valve, the pump select valve housing further including a first conduit and a second conduit, the pump select valve piston separating the first and second conduits, the first conduit in direct fluid communication with the outlet port of the fuel metering valve;
the throttling valve further includes a throttling valve piston within a throttling valve housing, the throttling valve housing having an inlet conduit and an outlet port in selective fluid communication through the throttling valve housing, the throttling valve piston moving within the throttling valve housing to selectively adjust the fluid communication from the inlet conduit and the outlet port, the inlet conduit in direct fluid communication with the outlet port of the fuel metering valve, the throttling valve further including a third conduit in direct fluid communication with the second conduit of the valve housing of the pump select valve;
the throttling valve piston separating the third conduit from both the inlet conduit and the outlet port of the throttling valve housing.

8. The system for metering a fuel supply of claim 7, wherein the delta-P regulator includes a nozzle and a valve member for selectively opening and closing the nozzle, one side of the nozzle being in direct fluid communication with the outlet port of the metering valve and the other side of the nozzle in direct fluid communication with the third conduit of the throttling valve and the second conduit of the pump select valve, the valve member adjusting the flow of fluid through the nozzle between the outlet port of the metering valve and the third conduit of the throttling valve and the second conduit of the pump select valve.

9. The system for metering a fuel supply of claim 1, including an electrohydraulic servo valve (EHSV) coupled to the fuel metering valve and configured to move the fuel metering valve to a select position.

10. The system for metering a fuel supply of claim 9, including a linear variable displacement transducer coupled to the fuel metering valve and an electronic engine control (EEC), wherein a select position signal is communicated to the EEC.

11. A system for metering a fuel supply to an engine, the fuel supply including a first fuel supply pump and a second fuel supply pump, the system for metering comprising:
a fuel metering valve, including an inlet port and an outlet port, with the inlet port in selective fluid communication with the first and second fuel supply pumps and with the outlet port in fluid communication with the engine;
a throttling valve in fluid series with the outlet port of the fuel metering valve and the engine, the throttling valve is configured to throttle the outlet port of the metering valve; and
a pump select valve in fluid series with the inlet port of the fuel metering valve and the outlet of the second fuel supply pump, the pump select valve is configured to throttle the outlet of the second fuel supply pump,
wherein the throttling valve and pump select valve are in direct fluid communication with each other and configured to provide a stabilizing pumping volume of the outlet volume of the fuel metering valve.

12. The system for metering a fuel supply of claim 11, wherein the pump select valve is further configured to selectively couple the second fuel supply pump and the fuel metering valve in fluid series.

13. The system for metering a fuel supply of claim 11, wherein the first fuel supply pump is directly coupled, in fluid series, with the inlet port to the fuel metering valve.

14. The system for metering a fuel supply of claim 11, wherein the throttling valve is biased in a closed position and the pump select valve is biased in an open position.

15. The system for metering a fuel supply of claim 11, including a delta-P regulator in fluid communication with the outlet port of the fuel metering valve and each of the pump select valve and throttling valve, wherein a pressure difference between the inlet port and outlet port of the fuel metering valve is controlled at a preselected set point.

16. The system for metering a fuel supply of claim 11, including an electrohydraulic servo valve (EHSV) coupled to the fuel metering valve and configured to move the fuel metering valve to a select position.

17. The system for metering a fuel supply of claim 16, including a linear variable displacement transducer coupled to the fuel metering valve and an electronic engine control, wherein a select position signal is communicated to the electronic engine control.

18. A system for metering a fuel supply to an engine, the fuel supply including a first fuel supply pump and a second fuel supply pump, the system for metering comprising:
a fuel metering valve, including an inlet port and an outlet port, with the inlet port in selective fluid communication with the first and second fuel supply pumps and with the outlet port in fluid communication with the engine;
a throttling valve in fluid series with the outlet port of the fuel metering valve and the engine, the throttling valve is configured to throttle the outlet port of the fuel metering valve;
a pump select valve in fluid series with the inlet port of the fuel metering valve and the outlet of the second fuel supply pump, the pump select valve is configured to throttle the outlet of the second fuel supply pump, and
a delta-P regulator in fluid communication with the outlet port of the fuel metering valve and each of the pump select valve and throttling valve,
wherein a pressure difference between the inlet port and outlet port of the fuel metering valve is controlled at a preselected set point and wherein the throttling valve and pump select valve are in direct fluid communication with each other and configured to provide a stabilizing pumping volume of the outlet volume of the fuel metering valve.

19. The system for metering a fuel supply of claim 18, wherein the pump select valve is further configured to selectively couple the second fuel supply pump and the fuel metering valve in fluid series.

20. The system for metering a fuel supply of claim 18, wherein the first fuel supply pump is directly coupled, in fluid series, with the input port to the fuel metering valve.

21. The system for metering a fuel supply of claim 18, wherein the throttling valve is biased in a closed position and the pump select valve is biased in an open position.

22. The system for metering a fuel supply of claim 18, including an electrohydraulic servo valve (EHSV) coupled to the fuel metering valve and configured to move the fuel metering valve to a select position.

23. The system for metering a fuel supply of claim 22, including a linear variable displacement transducer coupled to the fuel metering valve and an electronic engine control, wherein a select position signal is communicated to the electronic engine control.

24. A redundant fuel supply system for an engine, with a first fuel supply and a second fuel supply, the system comprising:
a first fuel pump coupled to the first fuel supply;
a second fuel pump coupled to the second fuel supply;
a fuel metering valve, including an inlet port and an outlet port, with the inlet port in selective fluid communication with the first and second fuel supply pumps and with the outlet port in fluid communication with the engine;
a throttling valve in fluid series with the outlet port of the fuel metering valve and the engine, the throttling valve is configured to throttle the outlet port of the fuel metering valve;
a pump select valve in fluid series with the inlet port of the fuel metering valve and the outlet of the second fuel supply pump, the pump select valve is configured to throttle the outlet of the second fuel supply pump, and
a delta-P regulator in fluid communication with the outlet port of the fuel metering valve and each of the pump select valve and throttling valve,
wherein a pressure difference between the inlet port and outlet port of the fuel metering valve is controlled at a preselected set point and wherein the throttling valve and pump select valve are in direct fluid communication with each other and configured to provide a stabilizing pumping volume of the outlet volume of the fuel metering valve.

25. The redundant fuel supply system for an engine of claim 24, wherein the pump select valve is further configured to selectively couple the second fuel supply pump and the fuel metering valve in fluid series.

26. The redundant fuel supply system for an engine of claim 24, wherein the first fuel supply pump is directly coupled, in fluid series, with the inlet port to the fuel metering valve.

27. The redundant fuel supply system for an engine of claim 24, wherein the throttling valve is biased in a closed position and the pump select valve is biased in an open position.

28. The redundant fuel supply system for an engine of claim 24, including an electrohydraulic servo valve (EHSV) coupled to the fuel metering valve and configured to move the fuel metering valve to a select position.

29. The redundant fuel supply system for an engine of claim 28, including a linear variable displacement transducer coupled to the fuel metering valve and an electronic engine.

30. The redundant fuel supply system for an engine of claim 24, wherein the first fuel pump is one of a centrifugal pump and a pressure regulated positive displacement pump and the second fuel pump is one of a centrifugal pump and a pressure regulated positive displacement pump.

\* \* \* \* \*

UNITED STATES PATENT AND TRADEMARK OFFICE
CERTIFICATE OF CORRECTION

| | | |
|---|---|---|
| PATENT NO. | : 7,966,994 B2 | Page 1 of 1 |
| APPLICATION NO. | : 12/189859 | |
| DATED | : June 28, 2011 | |
| INVENTOR(S) | : Joel W. Kleckler | |

It is certified that error appears in the above-identified patent and that said Letters Patent is hereby corrected as shown below:

Title Pg, Item (73) Assignee: "Woodcard" should be -- Woodward --.

Signed and Sealed this
Twenty-third Day of August, 2011

David J. Kappos
*Director of the United States Patent and Trademark Office*